United States Patent [19]

McGuire, Jr.

[11] Patent Number: 5,113,889
[45] Date of Patent: May 19, 1992

[54] FLOATING INTAKE FOR TRANSPORT OF LIQUID FROM A FIXED DEPTH BELOW THE SURFACE OF A RESERVOIR

[76] Inventor: Virgil M. McGuire, Jr., Rte. 3, Box 299, Hamilton, Ala. 35570

[21] Appl. No.: 659,179

[22] Filed: Feb. 22, 1991

[51] Int. Cl.⁵ ...................... F16K 31/20; F16K 33/00
[52] U.S. Cl. ........................................ 137/2; 137/135; 137/398; 405/127
[58] Field of Search ............. 137/1, 2, 101.25, 101.27, 137/132, 135, 398, 438, 578, 579, 590, 592; 405/96, 97, 127

[56] References Cited

U.S. PATENT DOCUMENTS

| | | | |
|---|---|---|---|
| 638,657 | 12/1899 | Ulrich | 137/578 |
| 716,483 | 12/1902 | Ryan | 137/135 |
| 841,176 | 1/1907 | Powers | 137/578 |
| 930,903 | 10/1909 | Tucker | 137/578 |
| 947,325 | 1/1910 | Callaway | 137/578 |
| 1,544,640 | 7/1925 | Gibbs | 137/398 |
| 2,207,378 | 7/1940 | Hirsch | 137/578 |
| 2,300,820 | 11/1942 | Vogel . | |
| 2,546,963 | 4/1951 | Black . | |
| 2,580,637 | 1/1952 | Wright | 137/430 |
| 2,716,422 | 8/1955 | Whitlock, Jr. . | |
| 2,756,766 | 7/1956 | Tronic . | |
| 3,351,084 | 11/1986 | Halikiades . | |
| 3,555,829 | 1/1971 | Trewhella . | |
| 3,575,044 | 4/1971 | Gachne . | |
| 3,927,534 | 12/1975 | Larson . | |
| 4,222,520 | 9/1980 | Melcher | 137/578 |
| 4,305,426 | 12/1981 | Scheid et al. | 137/578 |
| 4,405,458 | 9/1983 | McHugh, Jr. . | |

FOREIGN PATENT DOCUMENTS 809087 10/1981 U.S.S.R. .
871153 10/1981 U.S.S.R. .
1214836 2/1986 U.S.S.R. .

OTHER PUBLICATIONS

"USDA Considering Use of Local Invention"—Article in unknown newspaper—1988.
"USDA Recognizes McGuire On Floating Intake Device"—The Progress—Nov. 10, 1988.

*Primary Examiner*—George L. Walton
*Attorney, Agent, or Firm*—Dickinson, Wright, Moon, Van Dusen & Freeman

[57] ABSTRACT

Water is supplied from a preselected depth in a body of water by an intake held at the preselected depth by a stem connected to a float which rides near the surface of the water. The stem is weighted to maintain a desired orientation of the device in the body of water. A guide is provided in the body of water to maintain the horizontal position of the intake means.

11 Claims, 1 Drawing Sheet

FLOATING INTAKE FOR TRANSPORT OF LIQUID FROM A FIXED DEPTH BELOW THE SURFACE OF A RESERVOIR

TECHNICAL FIELD

This invention relates to the art of water supply and conservation. In particular, the invention is a floating intake for supply of water from a pond.

BACKGROUND

It is often desired to withdraw water from a pond or other accumulation of water. This is accomplished in a variety of ways. For example, U.S. Pat. No. 3,927,534 (Larson) shows an intake which is fixed to the bottom of a body of water and thus supplies water from a location fixed with respect to the bottom of the body. U.S. Pat. No. 4,405,458 (McHugh, Jr.) shows a weir which floats on the surface of the body and, thus, supplies water from the top of the body. Other supply devices are known which supply water from fixed locations but which may have float controlled valves to stop the flow of water when the level of the body is too high or too low.

One problem faced by water and soil conservation engineers is that the water in a pond varies as a function of the depth of the water. At increased depths, for example, the oxygen content of the water may be too low, while at shallow depths, the algae or other plant life growth may be significant enough that the water is not useful. Accordingly, it is often desirable to supply water from a selected depth.

SUMMARY OF THE INVENTION

In accordance with the invention, a floating water intake is provided which supplies water from a selected depth below the surface of the water. The intake comprises a float which rides on the surface of the body of water, a weighted stem which is attached to the float and extends into the body of water, and an intake grate and supply pipe connected to the weighted stem. The weighted stem maintains the orientation of the device and holds the intake grate a distance below the float which is determined by the length of the stem. Because the float rides on the surface of the water, the intake always supplies water from the predetermined depth.

The depth is chosen such that the water has a selected quality. For example, the device of the invention has been used to recirculate waste water by placing the device of the invention in a body of waste water at a level that the plant life on the surface of the water is avoided and the water has an adequate amount of oxygen. This depth may, for example, be about thirty inches. Other uses may require supply of water from other depths.

The device of the invention may be made in a variety of sizes and used to supply water to fire hydrants in rural areas, for irrigation, or to provide water for livestock.

DETAILED DESCRIPTION OF THE PREFERRED EMBODIMENT

Figure 1:
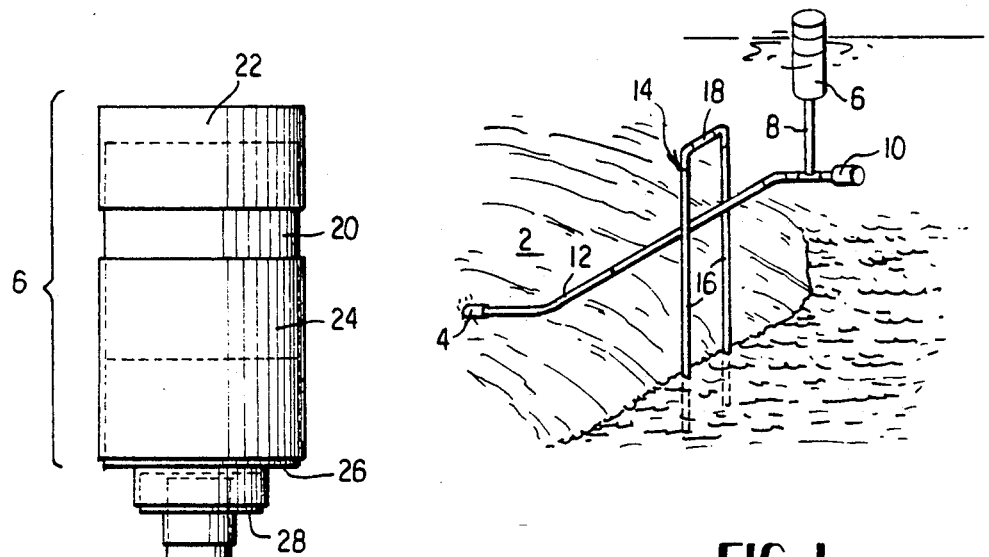
FIG. 1 is a perspective of a floating water intake system in accordance with the invention.

FIG. 1 shows a system according to the invention installed in a body of water. A dam 2, such as an earthen dam, is at a lower end of the body of water, and an outlet pipe 4 extends through the dam to supply the water for a variety of uses. An apparatus for providing water from a selected depth comprises a float 6 which has adequate buoyancy to float near the surface of the water, a weighted stem 8 connected to the float, and an inlet connected to the bottom of the stem.

The stem 8 has a weight sufficient to maintain the orientation of the apparatus to that shown in FIG. 1 wherein the intake 10 is maintained directly below the float 6 by a distance which is set by the length of the stem 8.

A flexible hose 12 extends between the intake 10 and the outlet pipe 4 and conducts the water admitted at the inlet to the outlet pipe. A guide 14 comprises two upstanding parallel bars 16 and a horizontal bar 18 connecting the tops of the upstanding bars. The upstanding bars 16 are placed just up from the entry of the outlet pipe into the dam and have heights such that the flexible hose will not engage the horizontal bar when the water level is at a maximum for the pond. The bars 16 are preferably spaced by about six inches.

The guide 14 maintains the position of the flexible hose and, consequently, the positions of the float and inlet. If the wind or water current would tend to move the float sideways, the flexible hose will engage one of the upstanding bars 16 to resist the movement. If the wind or current tend to pull the float upstream, the flexible hose 12 will resist movement, and movement of the float downstream toward the dam will be resisted by the flexible hose and, possibly, by engagement between the horizontal bar 18 and the flexible hose 12.

Figure 2:
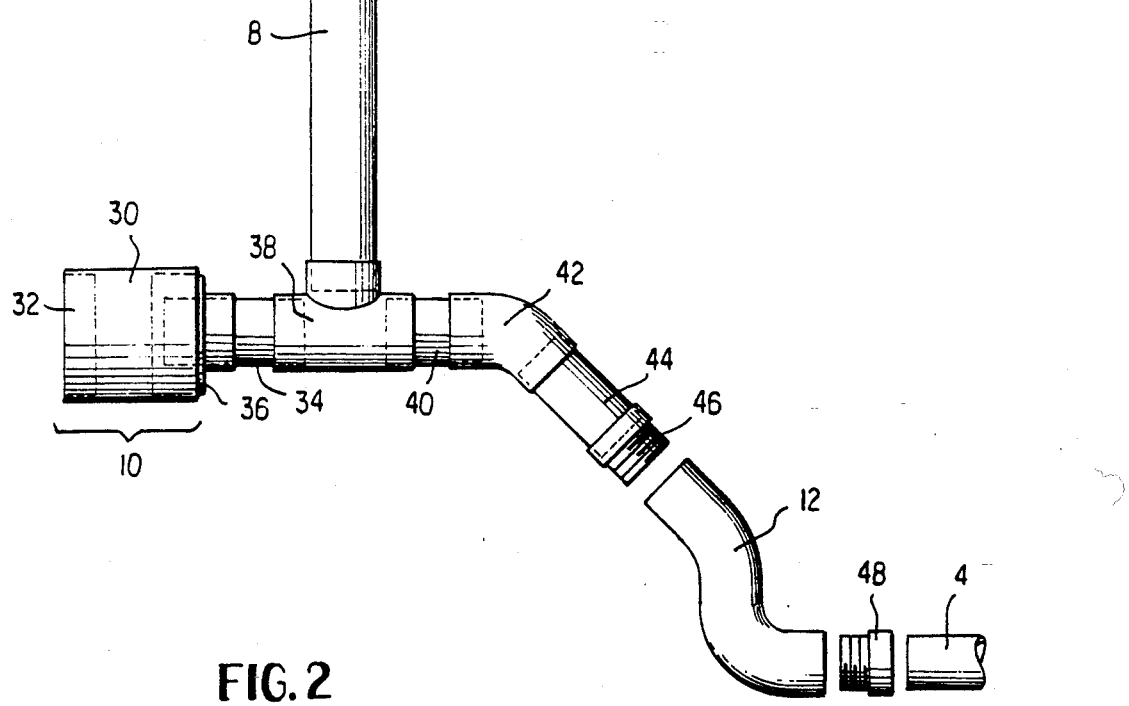
FIG. 2 is a detailed side view of the floating intake shown in the system of FIG. 1.

FIG. 2 is a side view of a preferred construction of the float, stem, and inlet. The float comprises a section 20 of PVC pipe (e.g., of 6 inch diameter) which may be filled with Styrofoam. The pipe has a PVC cap 22 at one end and a PVC coupling 24 at the other end. A first reducer 26 and second reducer 28 connect the float 6 to the weighted stem 8. The stem 8 may be PVC pipe (e.g., 2 inch diameter) which has been filled with concrete or solid PVC pipe, the objective being to provide enough weight that the intake 10 will always be held below the float in the orientation shown. The intake 10 comprises a PVC coupling 30 (e.g., 4 inch diameter) and a grate insert 32. The coupling 30 is attached to a pipe 34 by a reducer 36, and the pipe 34 is connected to a "T" joint 38. The middle part of the "T" joint 38 is connected to the stem such that the inlet is supported and held below the float at the desired depth. Pipe 40 connects to the other side of the "T" 38 and to a 45° connector 42 which in turn is connected to flexible hose 12 by a pipe 44 and a threaded nipple 46. Connector 42 should be omitted if depth from water surface to supply pipe is 5 feet or less. The flexible hose 12 is connected to the outlet pipe 4 by second threaded nipple 48.

The float 6 may have a height of about one foot, and the stem may have a length of about fifteen to twenty inches.

In use, the float move with the level of water in the body, the intake being thus maintained at a preselected depth in the body for supply of water from that depth.

It will be appreciated that a unique device for supplying water from a preselected distance below the surface of a body of water has been described. Modifications within the scope of the appended claims will be apparent to those of skill in the art.

I claim:

1. Apparatus for supplying liquid from below the surface of a body of said liquid comprising intake means for receiving said liquid, float means for floating in said body at a predetermined relationship with respect to said surface and for supporting said intake means, stem means for connecting said float means to said intake means such that said intake means is below said surface, and outlet means for directing the flow of said liquid from said intake means, wherein said stem means is structured to be of substantial weight and density for ensuring that said intake means is maintained in said body of liquid at a predetermined depth below the surface of said liquid and in a predetermined orientation with respect to said float means for withdrawing liquid from said predetermined depth regardless of changes in the level of said liquid.

2. Apparatus according to claim 1 wherein said float means is designed to ride on the surface of said body of liquid.

3. Apparatus according to claim 1 wherein said float means is designed to ride on the surface of said body and said stem means is located to hold said intake means directly below said float means.

4. Apparatus according to claim 3 wherein said body of water is behind a dam, and said outlet means extends through said dam.

5. Apparatus according to claim 3 further comprising guide means for engaging said outlet means and maintaining the horizontal position of said intake while permitting free vertical movement of said intake means.

6. Apparatus according to claim 5 wherein said body of water is behind a dam, said outlet means extends through said dam, and said guide means is located between said float and said dam.

7. Apparatus according to claim 6 wherein said guide means comprises parallel bars on opposite sides of said outlet means.

8. Apparatus according to claim 1 wherein said stem means comprises a plastic pipe.

9. Apparatus according to claim 8 wherein said plastic pipe is filled with concrete.

10. Apparatus according to claim 8 wherein said plastic pie is solid.

11. A method for supplying water from a selected depth in a body of water comprising providing float means for floating in said body at a predetermined relationship with respect to the surface of said body, providing intake means for receiving said water, and supporting said intake means with stem means connecting said float means to said intake means, wherein said stem means is structured to be of substantial weight and density for ensuring that said intake means is maintained in said body of water at a predetermined depth below the surface of said water and in a predetermined orientation with respect to said float means for withdrawing water from said predetermined depth regardless of changes in the level of said water.

* * * * *